US012583361B2

(12) United States Patent
Ogaki et al.

(10) Patent No.: US 12,583,361 B2
(45) Date of Patent: Mar. 24, 2026

(54) BATTERY TEMPERATURE CONTROL METHOD AND BATTERY TEMPERATURE CONTROL SYSTEM

(71) Applicant: HONDA MOTOR CO., LTD., Tokyo (JP)

(72) Inventors: Toru Ogaki, Tokyo (JP); Shuhei Kouchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 180 days.

(21) Appl. No.: 18/501,797

(22) Filed: Nov. 3, 2023

(65) Prior Publication Data

US 2024/0149747 A1 May 9, 2024

(30) Foreign Application Priority Data

Nov. 4, 2022 (JP) ................................. 2022-177185

(51) Int. Cl.
*B60L 58/26* (2019.01)
*B60L 58/27* (2019.01)

(52) U.S. Cl.
CPC ............... *B60L 58/26* (2019.02); *B60L 58/27* (2019.02); *B60L 2260/52* (2013.01); *B60L 2260/54* (2013.01); *B60L 2260/56* (2013.01)

(58) Field of Classification Search
None
See application file for complete search history.

(56) References Cited

U.S. PATENT DOCUMENTS

2010/0324765 A1 12/2010 Iida et al.
2012/0280050 A1 11/2012 Tonozuka et al.
(Continued)

FOREIGN PATENT DOCUMENTS

JP 2009-044887 A 2/2009
JP 2011-152840 A 8/2011
(Continued)

OTHER PUBLICATIONS

Sep. 17, 2024, Translation of Japanese Office Action issued for related JP Application No. 2024-060383.

*Primary Examiner* — Peter D Nolan
*Assistant Examiner* — Matthew Cobb
(74) *Attorney, Agent, or Firm* — Paratus Law Group, PLLC

(57) ABSTRACT

A battery temperature control method for controlling a temperature of a battery mounted on a vehicle by a temperature control device, the method comprises: a travel plan acquisition step of acquiring a travel plan of the vehicle, a battery input and output acquisition step of acquiring a required input and output of the battery, a target temperature acquisition step of acquiring a first battery temperature threshold, a battery temperature transition prediction step of predicting a temperature transition of the battery when the vehicle travels according to the travel plan, a temperature control amount prediction step of acquiring a predicted temperature control amount of the battery at a first time or a first position in the travel plan, an excessive temperature control amount calculation step of calculating an excessive temperature control amount, a temperature control restriction step, and a temperature control step of controlling the temperature of the battery.

13 Claims, 10 Drawing Sheets

(56)     References Cited

U.S. PATENT DOCUMENTS

| 2021/0031654 A1* | 2/2021 | Vizzini | B60L 58/12 |
| 2021/0210810 A1* | 7/2021 | Chuang | B60L 1/02 |
| 2023/0253644 A1 | 8/2023 | Kouchi et al. | |

FOREIGN PATENT DOCUMENTS

| JP | 2011-211868 A | 10/2011 |
| JP | 2015-070722 A | 4/2015 |
| JP | 2016-220310 A | 12/2016 |
| JP | 2018-107923 A | 7/2018 |
| JP | 2021-027797 A | 2/2021 |
| JP | 2023-114369 A | 8/2023 |

* cited by examiner

BATTERY TEMPERATURE CONTROL METHOD AND BATTERY TEMPERATURE CONTROL SYSTEM

CROSS-REFERENCE TO RELATED APPLICATIONS

This application is based on and claims priority under 35 USC 119 from Japanese Patent Application No. 2022-177185 filed on Nov. 4, 2022, the entire content of which is incorporated herein by reference.

TECHNICAL FIELD

The present invention relates to a battery temperature control method and a battery temperature control system for controlling a temperature of a battery mounted on a vehicle by a temperature control device.

BACKGROUND ART

In recent years, researches and developments have been conducted on a secondary battery (hereinafter, also referred to as a battery) that contributes to improvement in energy efficiency in order to allow more users to access affordable, reliable, sustainable, and advanced energy.

The battery is mounted on, for example, an electric vehicle such as an electric automobile or a hybrid electric automobile, and serves as a power source of a motor serving as a drive source of the vehicle or various devices mounted on the vehicle. A temperature of the battery is high or low depending on an environment around the vehicle or a use state of the vehicle. Since an input and output of the battery may be limited when the temperature of the battery is high or low, it is necessary to appropriately regulate (cool or heat) the temperature of the battery.

For example, JP2021-27797A discloses that a temperature upper limit of a main battery is set based on a maximum power load scheduled to be used, and look-ahead cooling for cooling the battery in advance is performed before a traveling start time point in order to prevent a battery temperature during traveling from exceeding the temperature upper limit.

However, in JP2021-27797A, an operation time of a temperature control system of the battery can be lengthened when the look-ahead cooling is performed. Accordingly, since the operation time of the temperature control system is lengthened, the power consumption increases, which leads to a decrease in cruising distance of the electric vehicle.

SUMMARY OF INVENTION

Aspect of non-limiting embodiments of the present disclosure relates to provide a battery temperature control method and a battery temperature control system capable of reducing power consumption for battery temperature control. Further, by extension, this contributes to the improvement in energy efficiency.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a battery temperature control method for controlling a temperature of a battery mounted on a vehicle by a temperature control device, the method including: a travel plan acquisition step of acquiring a travel plan of the vehicle; a battery input and output acquisition step of acquiring a required input and output of the battery predicted when the vehicle travels according to the travel plan; a target temperature acquisition step of acquiring a first battery temperature threshold which is a target temperature of the battery at which the required input and output is satisfied: a battery temperature transition prediction step of predicting a temperature transition of the battery when the vehicle travels according to the travel plan in a case where it is assumed that normal temperature control for controlling a temperature of the battery is executed such that the temperature of the battery is in a predetermined temperature range; a temperature control amount prediction step of acquiring a predicted temperature control amount of the battery at a first time or a first position in the travel plan in the case where it is assumed that the normal temperature control is executed; an excessive temperature control amount calculation step of calculating an excessive temperature control amount, which is an excessive amount in the predicted temperature control amount, based on the first battery temperature threshold and a predicted temperature of the battery at a second time later than the first time or a second position ahead of the first position: a temperature control restriction step of subtracting the excessive temperature control amount from the predicted temperature control amount at the first time or the first position and shortening an operation time of the temperature control device; and a temperature control step of controlling the temperature of the battery by operating the temperature control device.

DESCRIPTION OF EMBODIMENTS

Hereinafter, embodiments of a battery temperature control method and a battery temperature control system of the present invention will be described with reference to the accompanying drawings. First, a vehicle on which a battery is mounted will be described.

Vehicle

Figure 1:
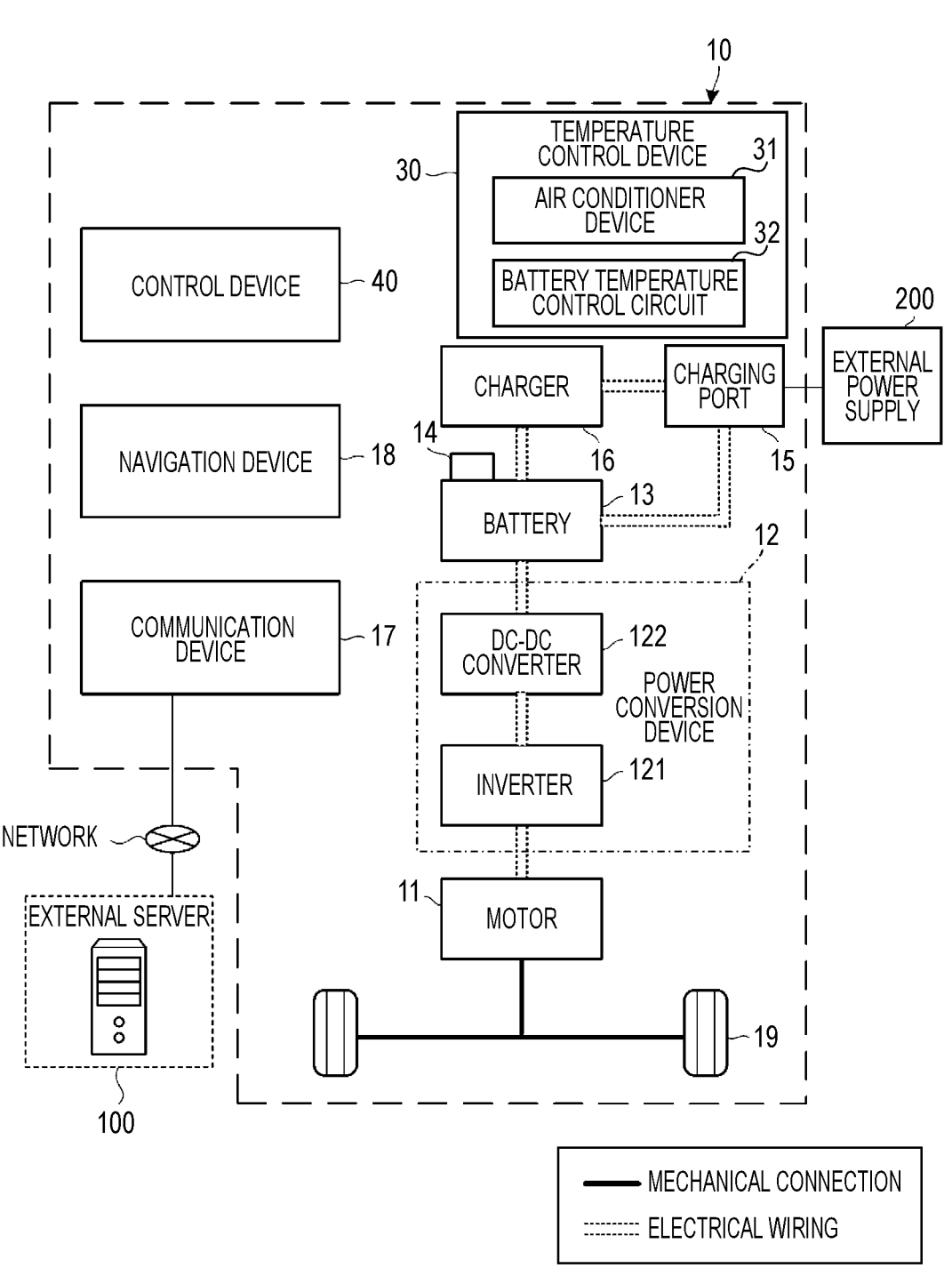
FIG. 1 is a block diagram showing an example of a schematic configuration of a vehicle 10 on which a battery 13 is mounted.

As shown in FIG. 1, the vehicle 10 includes a motor 11, a power control unit 12, a battery 13, a battery temperature sensor 14, a charging port 15, a charger 16, a communication device 17, a navigation device 18, a temperature control device 30, and a control device 40. The vehicle 10 is, for example, an electric vehicle such as an electric automobile or a plug-in hybrid automobile, and as will be described later, the battery 13 is configured to store electric power supplied from an external power supply 200 outside the vehicle 10, for example, a quick charger. In FIG. 1, a thick solid line indicates mechanical connection, and a double line indicates electric wiring. In addition, the configuration shown in FIG. 1 is an example, and a part of the configuration may be omitted, or another configuration may be added.

The motor 11 is, for example, a three-phase AC motor. An output of the motor 11 is transmitted to drive wheels 19 and kinetic energy of the vehicle is used to generate electricity when the vehicle 10 is decelerated.

The power control unit 12 includes, for example, an inverter 121 and a DC-DC converter 122. The DC-DC converter 122 steps up electric power supplied from the battery 13 and outputs the electric power to the inverter 121, and meanwhile, steps down electric power supplied from the inverter 121 and outputs the electric power to the battery 13. The inverter 121 converts a direct current supplied from the DC-DC converter 122 into an alternating current and outputs the alternating current to the motor 11, and meanwhile converts an alternating current generated by the motor 11 into a direct current and outputs the direct current to the DC-DC converter 122.

The battery 13 is, for example, a secondary battery such as a lithium ion battery. The battery 13 is charged by electric power introduced from the external power supply 200 outside the vehicle 10, for example, a quick charger provided in a parking area of an expressway. The battery 13 mainly supplies electric power to the motor 11. Examples of the battery temperature sensor 14 include a voltage sensor, a current sensor, and a temperature sensor. The voltage sensor, the current sensor, and the temperature sensor detect a current value, a voltage value, and a temperature of the battery 13, respectively. The battery temperature sensor 14 outputs the detected current value, voltage value, and temperature to the control device 40.

The charging port 15 is connected to (plugged in) the external power supply 200 via a charging cable. The connection between the vehicle 10 and the external power supply 200 is not limited thereto. For example, a power receiving coil or the like capable of receiving, in a non-contact manner, electric power transmitted from the external power supply 200 may be provided in the vehicle 10.

The charger 16 is provided between the battery 13 and the charging port 15. The charger 16 converts a current introduced from the external power supply 200 via the charging port 15, for example, an AC current into a DC current during normal charging. The charger 16 outputs the converted DC current to the battery 13.

The communication device 17 includes a wireless module for connecting a cellular network or a Wi-Fi network. The communication device 17 is, for example, a communication interface that communicates, via a network such as the Internet or the Ethernet, with an external server 100 (to be described in detail later) provided outside the vehicle 10. The communication device 17 communicates with the external server 100 and transmits an output transmitted from the external server 100 to the control device 40.

The navigation device 18 includes a global positioning system (GPS) unit, a processor, a memory that stores such as map data, a display, an operation unit (touch panel, etc.), and the like. The navigation device 18 acquires position information of the vehicle 10 that receives a GPS signal.

The navigation device 18 determines, for example, a route from an own vehicle position that is a current location of the vehicle 10 to a destination set by a user of the vehicle 10 with reference to the map data or the like. Further, the navigation device 18 acquires state of charge (SOC) information of the battery 13 from the control device 40, and when charging is necessary, creates a travel plan in which charging at a charging station is incorporated in a guidance route. Then, the navigation device 18 displays the travel plan on a display to guide the user. A part or all of functions of the navigation device 18 may be implemented by, for example, functions of a user terminal such as a smartphone or a tablet terminal possessed by the user of the vehicle 10.

Figure 2:
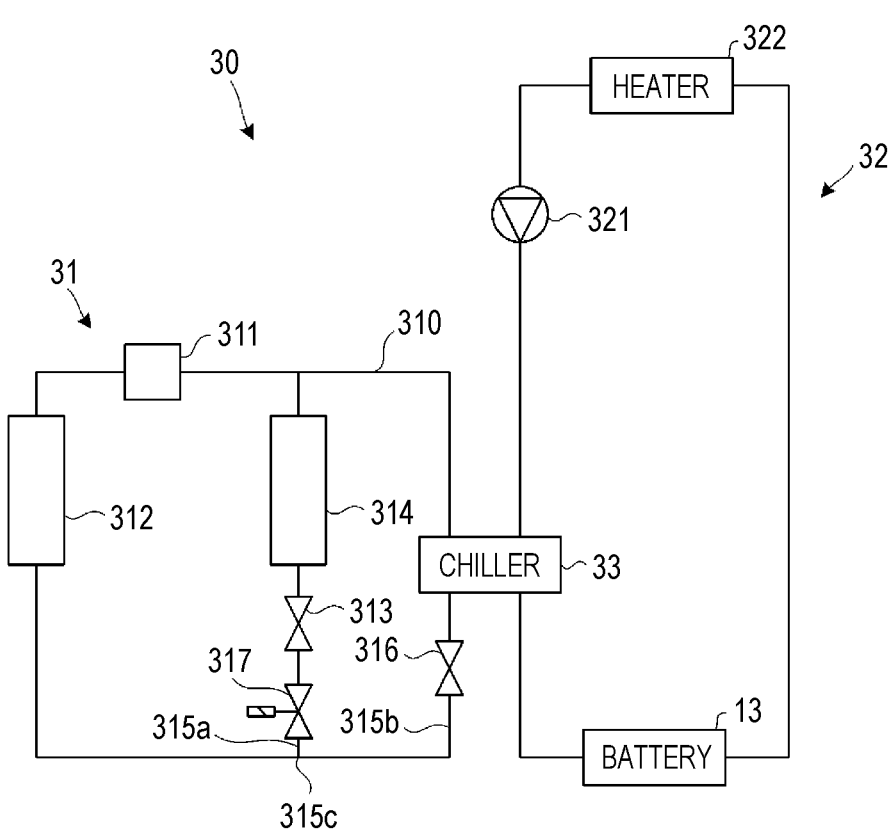
FIG. 2 is a diagram showing a configuration of a temperature control device 30.

The temperature control device 30 includes an air conditioner device 31 and a battery temperature control circuit 32. As shown in FIG. 2, the air conditioner device 31 includes a refrigeration cycle 310, and is an air conditioner that adjusts an environment of a vehicle interior by adjusting a state of air in the vehicle interior. The battery temperature control circuit 32 causes a refrigerant to flow through a refrigerant flow path, thereby cooling or heating the battery 13 and the like. An operation of the battery temperature control circuit 32 is controlled by the control device 40 such that the temperature of the battery 13 is present in a predetermined temperature range based on a temperature control capacity of the battery temperature control circuit 32.

As shown in FIG. 2, in the temperature control device 30, the refrigeration cycle 310 of the air conditioner device 31 and the battery temperature control circuit 32 are configured such that refrigerants therein exchange heat with each other via a chiller 33.

More specifically, the refrigeration cycle 310 of the air conditioner device 31 includes a compressor 311, a condenser 312, an expansion valve 313, and an evaporator 314 in series. Further, in the refrigeration cycle 310, a second flow path 315b in which another expansion valve 316 and the chiller 33 are arranged is provided in parallel to a first flow path 315a in which the expansion valve 313 and the evaporator 314 are arranged. A shutoff valve 317 is provided between a branch 315c between the first flow path 315a and the second flow path 315b and the expansion valve 313. When the shutoff valve 317 is turned on, the refrigerant flows to both the first flow path 315a and the second flow path 315b, and when the shutoff valve 317 is turned off, the refrigerant flows only to the second flow path 315b.

In the battery temperature control circuit 32, an electric water pump 321 for supplying the refrigerant, the chiller 33, the battery 13, and a heater 322 are connected in series.

In the chiller 33, heat exchange is performed between the refrigerant of the refrigeration cycle 310 and the refrigerant of the battery temperature control circuit 32. Due to the heat exchange in the chiller 33, a cooling capacity of the refrigeration cycle 310 is distributed to the air conditioner and battery cooling. Here, the cooling capacity of the refrigeration cycle 310 is an amount of heat that the chiller 33 can absorb from the refrigerant of the battery temperature control circuit 32. When the air conditioner device 31 is not used, the shutoff valve 317 is turned off, and all of the cooling capacity of the refrigeration cycle 310 can be used for the battery cooling. When the air conditioner device 31 is used, the shutoff valve 317 is turned on, and a cooling capacity of the refrigeration cycle 310 which can be used for the battery cooling is reduced by an amount distributed to the air conditioner.

On the other hand, in the battery temperature control circuit 32, the heater 322 is turned on to heat the refrigerant flowing through the battery temperature control circuit 32 during heating of the battery 13. Then, the refrigerant heated by heater 322 heats the battery 13.

With reference to FIG. 1 again, the control device 40 is implemented by an electronic control unit (ECU) including a processor, a memory, an interface, and the like. The control device 40 controls various devices mounted on the vehicle 10, for example, the motor 11, the power control unit 12, the battery 13, the charger 16, the navigation device 18, and the temperature control device 30. Further, the control device 40 is configured to acquire information transmitted from the external server 100 via the communication device 17. Each function of the control device 40 does not have to be implemented by one control device, and may be implemented by separate control devices.

Battery Temperature Control System

Figure 3:
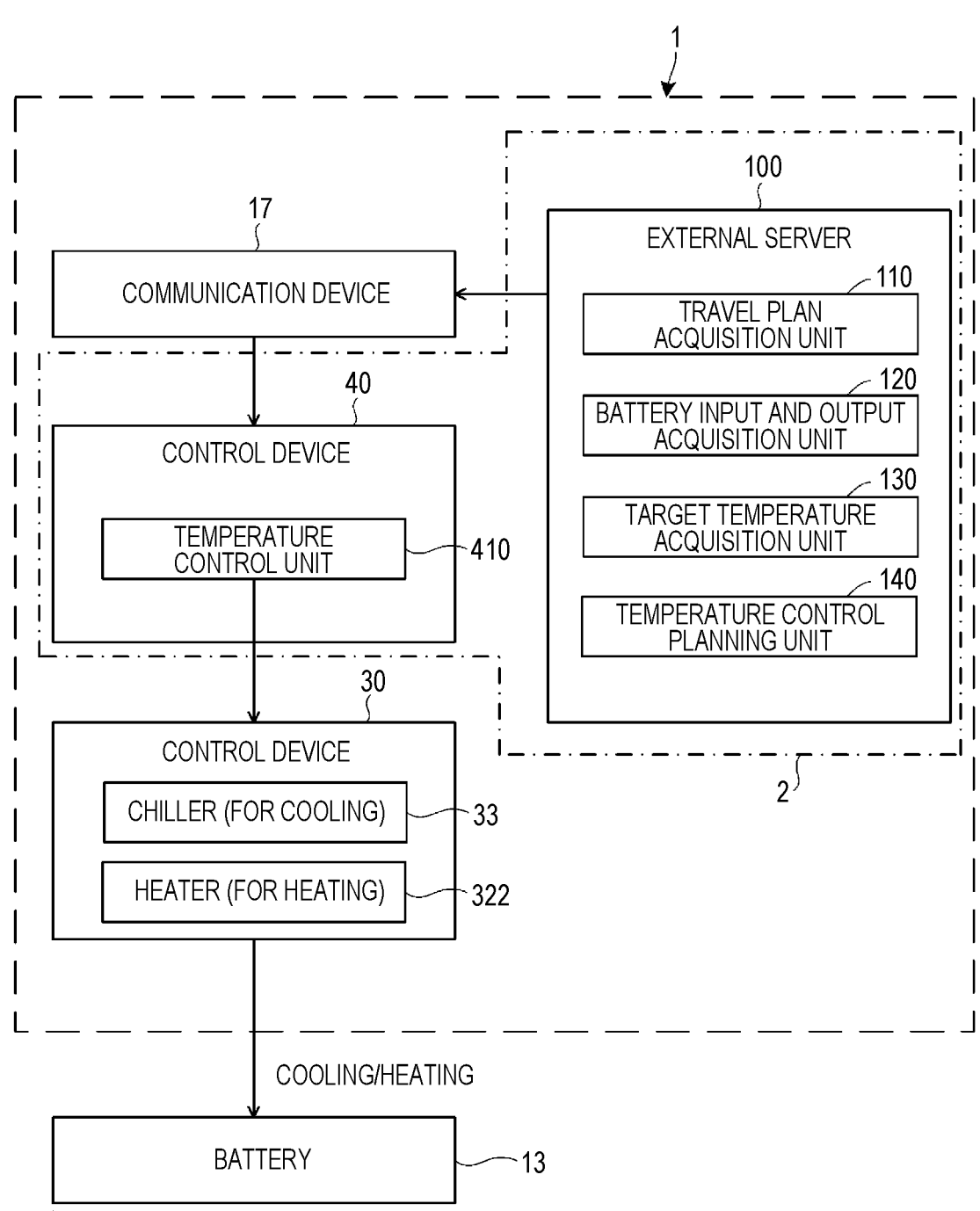
FIG. 3 is a block diagram showing an example of a schematic configuration of a battery temperature control system 1 which is an embodiment of a battery temperature control system of the present invention.

As shown in FIG. 3, a battery temperature control system 1 includes the control device 40, the temperature control device 30, and the communication device 17 which are provided in the vehicle 10, and the external server 100. The battery temperature control method of the present invention is executed by the battery temperature control system 1. Then, the control device 40 and the external server 100 constitute an information processing device 2 that performs calculation processing in the battery temperature control method.

The external server 100 includes a travel plan acquisition unit 110, a battery input and output acquisition unit 120, a target temperature acquisition unit 130, and a temperature control planning unit 140, and performs at least one step of the battery temperature control method of the present invention. The control device 40 includes a temperature control unit 410, and the temperature control unit 410 operates the temperature control device 30 to control the temperature of the battery 13 based on a temperature control plan for the battery 13 acquired from the temperature control planning unit 140.

Battery Temperature Control Method

Next, the battery temperature control method of the present invention executed by the battery temperature control system 1 will be described. In the following description, first, cooling of the battery 13 will be described, and heating of the battery 13 will be described next.

Battery Cooling

Prior to the description of the battery temperature control method of the present invention, first, normal temperature control executed by the control device 40 will be described. The normal temperature control is control in which the temperature of the battery 13 is controlled by the control device 40 so as to be present in a predetermined temperature range based on the temperature control capacity of the battery temperature control circuit 32. The predetermined temperature range in the normal temperature control is a temperature range between a lower limit value T0_low and an upper limit value T0_high, and the lower limit value T0_low and the upper limit value T0_high are values set in advance at the time of manufacturing the control device 40.

Figure 7:
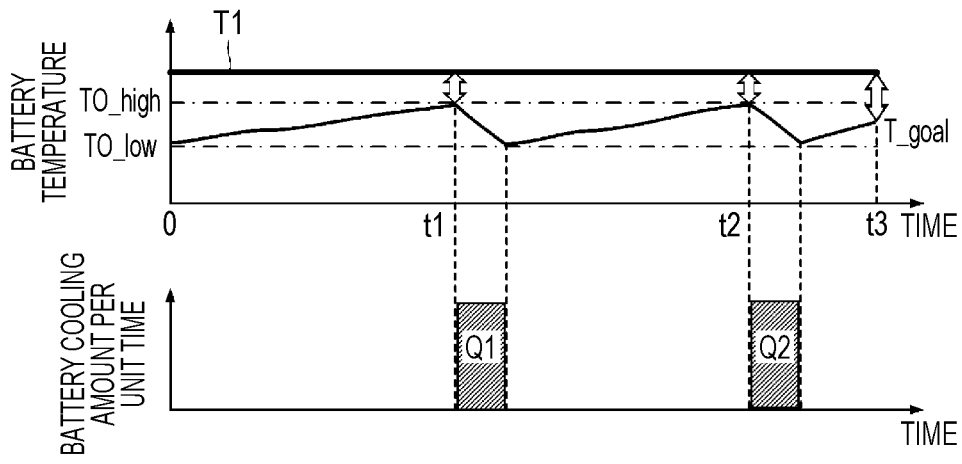
FIG. 7 is a graph showing a temperature transition (upper side) and a temperature control plan (lower side) of the battery 13 in a case of cooling the battery 13 according to normal temperature control.

FIG. 7 is a graph showing a temperature transition (upper graph) and a temperature control plan (lower graph) of the battery 13 in a case of cooling the battery 13 according to the normal temperature control. For example, in a case where the battery 13 generates heat and the battery temperature rises while the vehicle 10 is traveling, when the battery temperature reaches the upper limit value T0_high, the control device 40 operates the temperature control device 30 to cool the battery 13 such that the battery temperature does not exceed the upper limit value T0_high. More specifically, the control device 40 operates the temperature control device 30 to cool the battery 13 until the battery temperature reaches the lower limit value T0_low. A battery cooling amount in the temperature control plan is an amount of heat that the chiller 33 can absorb from the refrigerant of the battery temperature control circuit 32. In the lower graph of FIG. 7, a vertical axis represents a battery cooling amount per unit time, and a product (that is, shaded portion areas Q1 and Q2 in the graph) obtained by multiplying the battery cooling amount per unit time by a cooling time (an operation time of the temperature control device 30) corresponds to an amount of heat absorbed from the refrigerant of the battery temperature control circuit 32 by the chiller 33 during cooling.

Figure 6:
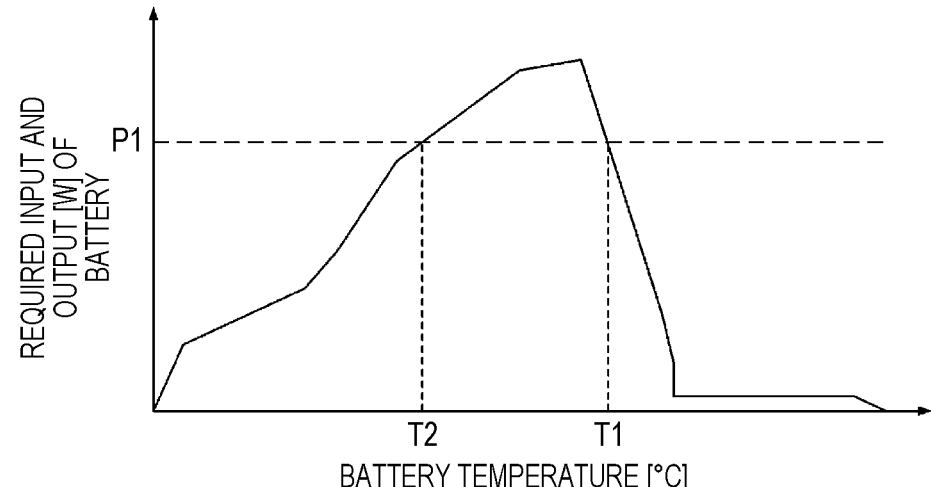
FIG. 6 is a diagram showing a relationship between a temperature of the battery 13 and the required input and output P.

In the battery, an allowable value that can be input and output varies depending on the temperature. FIG. 6 shows a relationship between the battery temperature and an input and output, and an allowable value of the input and output is maximized in a certain temperature range (for example, a range from 20° C. to 30° C.), and the allowable value decreases toward a higher temperature side and a lower temperature side from the temperature range. When the input and output of the battery is P1 [W], the battery temperature needs to be present in a temperature range (in this case, between a low-temperature-side threshold T2 and a high-temperature-side threshold T1) in which input and output equal to or higher the required input and output P1 is allowed.

As shown in FIG. 7, the lower limit value T0_low and the upper limit value TO high in the normal temperature control are set to be lower than the high-temperature-side threshold T1 at which the battery temperature allows input and output equal to or higher than the required input and output P1, and a margin (that is, a difference between the high-temperature-side threshold T1 and the upper limit value T0_high) is provided such that the battery temperature does not exceed the high-temperature-side threshold T1 easily. On the other hand, in the normal temperature control, since the battery 13 is cooled when the battery temperature reaches the upper limit value T0_high, the temperature control device 30 is operated more frequently and an operation time is lengthened as compared with a case where the battery 13 is cooled when the battery temperature reaches the high-temperature-side threshold T1. In other words, in the normal temperature control, there is a concern that the battery 13 may be cooled excessively, the power consumption of the temperature control device 30 increases, and a cruising distance of the vehicle 10 may decrease.

In the battery temperature control method of the present invention, the temperature control plan for the battery 13 that prevents the excessive temperature control (cooling/heating) described above is simulated based on the travel plan of the vehicle 10. Then, the temperature control device 30 is operated based on the simulation result. Hereinafter, an embodiment of the battery temperature control method will be described with reference to the flow shown in FIG. 4.

First, the control device 40 determines whether the vehicle 10 can be connected to the network, that is, whether the control device 40 can communicate with the external server 100 (step S10). In the present embodiment, since the external server 100 is configured to perform a part of steps of the battery temperature control method, it is first determined whether communication between the control device 40 and the external server 100 is possible. When the control device 40 can be connected to the network (step S10: YES), the control device 40 communicates with the external server 100 and proceeds to step S12.

On the other hand, when the control device 40 cannot be connected to the network (step S10: NO), that is, when the communication device 17 cannot communicate with the external server 100, the control device 40 (the temperature control unit 410) controls the temperature control device 30 to control the temperature of the battery 13 according to the above-described normal temperature control without performing a simulation of the temperature control plan (step S11). As described above, even when the control device 40 cannot communicate with the external server 100, the temperature of the battery 13 can be controlled according to the normal temperature control, so that the deterioration of a battery capacity due to the inability to control the temperature of the battery 13 can be prevented.

In step S12, the travel plan acquisition unit 110 acquires the travel plan from the current location to the destination, which is created based on the current location of the vehicle 10 acquired from the navigation device 18 or the user terminal and the destination received from the navigation device 18 or the user terminal. The travel plan includes, for example, route information from the current location to the destination, traffic information (for example, congestion information), charging plan information when charging is performed at a charging station on the way, or the like. The travel plan acquisition unit 110 may be configured to receive and acquire the travel plan created by the navigation device 18 or the user terminal, or may create and acquire the travel plan based on information related to the current location and the destination obtained from the navigation device 18 or the user terminal, the map data stored in the external server 100, and the like.

Figure 5:
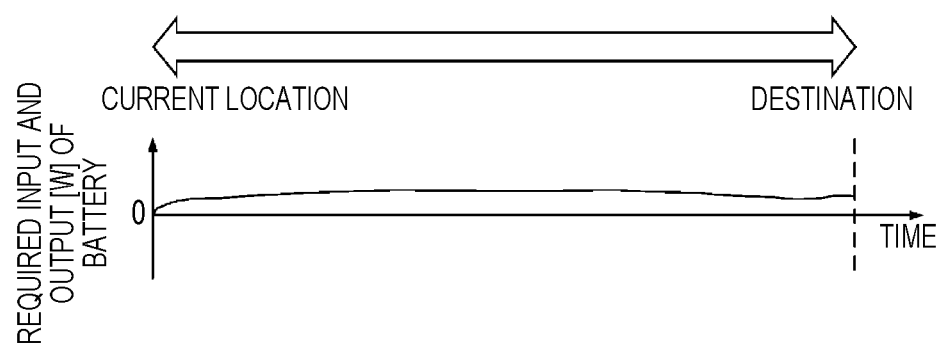
FIG. 5 shows an example of a required input and output P of the battery 13 when the vehicle 10 travels from a current location to a destination.

Next, the battery input and output acquisition unit 120 acquires the required input and output P[W] of the battery 13 predicted when the vehicle 10 travels according to the travel plan (step S14). The required input and output P of the battery 13 includes, for example, an output of the battery 13 required to drive the motor 11, an output of the battery 13 required to operate the air conditioner device 31 or the battery temperature control circuit 32, and an input to the battery 13 when the battery 13 is charged. The battery input and output acquisition unit 120 calculates, based on the travel plan, the input and output of the battery 13 required in the future. FIG. 5 shows an example of the required input and output P (required output) of the battery 13 when the vehicle 10 travels from the current location to the destination.

Next, the target temperature acquisition unit 130 acquires a first battery temperature threshold that is a target temperature of the battery 13 at which the required input and output P of the battery 13 is satisfied (step S16). In a case of cooling the battery 13, the first battery temperature threshold is the high-temperature-side threshold T1. That is, the target temperature acquisition unit 130 acquires the high-temperature-side threshold T1 based on the relationship between the battery temperature and the input and output (see FIG. 6) prepared in advance and the required input and output P of the battery 13 acquired in step S14, and sets the high-temperature-side threshold T1 as the first battery temperature threshold.

Next, when it is assumed that the temperature of the battery 13 is controlled by executing the normal temperature control, the temperature control planning unit 140 predicts the temperature transition of the battery 13 when the vehicle 10 travels according to the travel plan (step S18). Specifically, the temperature control planning unit 140 predicts the temperature transition of the battery 13 that is based on the normal temperature control as shown in FIG. 7.

Further, in step S18, the temperature control planning unit 140 acquires a predicted temperature control amount of the battery 13 (here, a predicted cooling amount) when it is assumed that the temperature of the battery 13 is controlled by executing the normal temperature control. As shown in the lower graph of FIG. 7, the predicted cooling amount is a predicted value of the battery cooling amount at the time of cooling, and is calculated by multiplying the battery cooling amount per unit time by an operation time of the temperature control device 30. When the cooling of the battery 13 is performed a plurality of times, the temperature control planning unit 140 acquires the predicted cooling amount at each time of cooling. In the example of FIG. 7, it is scheduled that the battery 13 is cooled twice while the vehicle 10 travels from the current location to the destination, and the predicted cooling amounts in the first cooling and the second cooling are denoted by Q1 and Q2, respectively.

Next, the temperature control planning unit 140 calculates a difference between a predicted temperature of the battery 13 and the first battery temperature threshold T1 at each of start times of the second and subsequent cooling of the battery 13 and a traveling end time of the vehicle 10 (step S20). In the example of FIG. 7, a difference T1–T0_high between a predicted temperature TO high of the battery 13 and the first battery temperature threshold T1 at a start time t2 of the second cooling is calculated. Further, a difference T1–T_goal between a predicted temperature T_goal of the battery 13 and the first battery temperature threshold T1 at a traveling end time t3 of the vehicle 10 is calculated.

Next, the temperature control planning unit 140 repeatedly performs the calculation so as to make the difference calculated in step S20 (a total value when the difference is calculated a plurality of times) zero, and updates the temperature transition and the temperature control plan of the battery as needed (step S22 to S34).

First, a first calculation (step S22: n=1) will be described. The temperature control planning unit 140 determines whether the difference calculated in step S20 is larger than zero (step S24). When the difference is zero (step S24: NO), the process proceeds to step S36. On the other hand, when the difference is larger than zero (step S24: YES), the process proceeds to step S26. In the example shown in FIG. 7, since the difference at the start time t2 of the second cooling and the difference at the traveling end time t3 are larger than zero, the process proceeds to step S26.

In step S26, the temperature control planning unit 140 calculates an excessive cooling amount Q1o which is an excessive amount in the predicted cooling amount Q1 in the first cooling. The excessive cooling amount is calculated based on the first battery temperature threshold T1 and the predicted temperature of the battery 13 at a start time of next cooling (that is, the second cooling). More specifically, the excessive cooling amount is calculated based on a difference between the first battery temperature threshold T1 and the predicted temperature of the battery 13 at the start time of the next cooling. When generalized using a natural number n, the excessive cooling amount of n-th cooling is calculated based on a difference between the first battery temperature threshold T1 and the predicted temperature of the battery 13 at a start time of (n+1)-th cooling. Further, the excessive cooling amount of the n-th cooling is calculated based on the difference between the first battery temperature threshold T1 and the predicted temperature of the battery 13 at the traveling end time when there is no next cooling.

Figure 8:
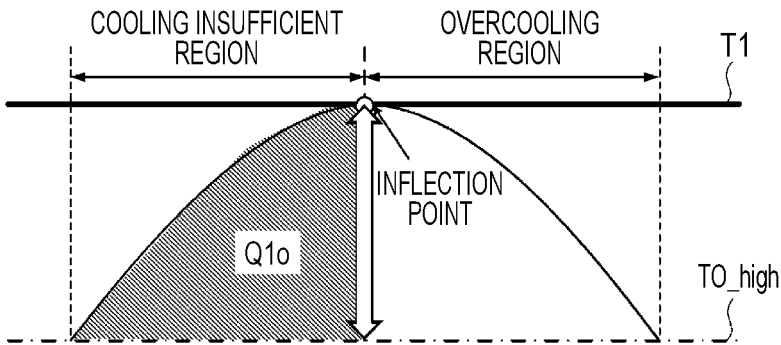
FIG. 8 is a diagram illustrating an excessive cooling amount.

The excessive cooling amount will be described in detail with reference to FIG. 8. FIG. 8 shows a graph of battery temperature prediction when the battery temperature reaches the first battery temperature threshold T1 without performing the second cooling even when the battery temperature reaches the upper limit value T0_high after the first cooling. As shown in FIG. 8, the excessive cooling amount Q1o corresponds to an area between the battery temperature prediction and the upper limit value T0_high from a time point when the battery temperature prediction exceeds the upper limit value T0_high to a battery temperature inflection point.

After step S26, the temperature control planning unit 140 subtracts the excessive cooling amount Q1o from the predicted cooling amount Q1 in the first cooling to shorten the operation time of the temperature control device 30 (step S28). In other words, at the time of the first battery cooling, the cooling is ended before the battery temperature reaches the lower limit value T0_low in the normal temperature control. Accordingly, the power consumption associated with the first battery cooling performed by the temperature control device 30 can be reduced.

Figure 9:
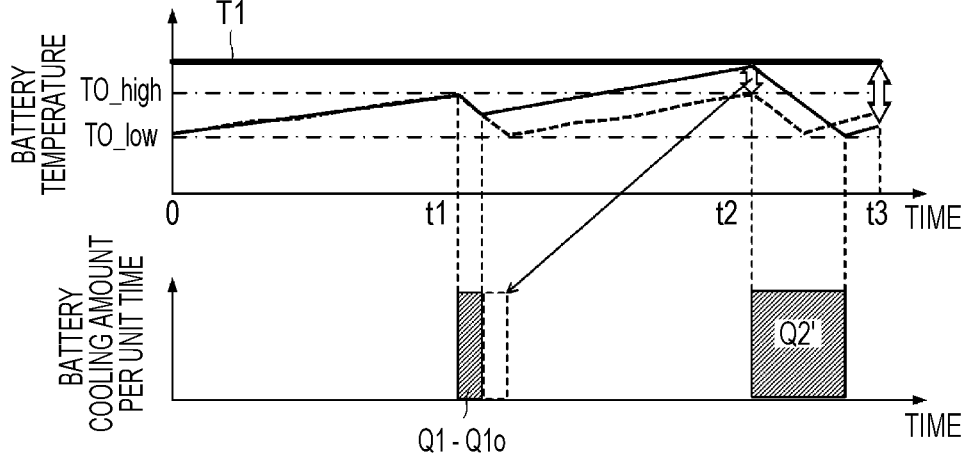
FIG. 9 is a graph in which the temperature transition and the temperature control plan of the battery 13 are updated in consideration of subtraction of an excessive cooling amount $Q1o$ at the time of first cooling.

Next, the temperature control planning unit 140 updates the temperature transition and the temperature control plan of the battery 13 in consideration of the subtraction of the excessive cooling amount Q1o (step S30). A solid line in an upper graph of FIG. 9 is the temperature transition of the battery 13 in consideration of shortening the first cooling time of the battery 13 in step S28. The temperature control planning unit 140 allows the battery temperature to exceed the upper limit value T0_high in the normal temperature control after the first cooling, and the battery temperature reaches the first battery temperature threshold T1 when the second cooling is started. Since the temperature transition and the temperature control plan of the battery 13 are updated in consideration of the subtraction of the excessive cooling amount Q1o, the predicted cooling amount Q2 in the second cooling is updated to Q2'.

As described above, prevention of excessive cooling in the first battery cooling is completed. Before proceeding to step S34, 1 is added to the number of times n of calculations for the repeated calculation to be subsequently executed (step S32).

Next, the temperature control planning unit 140 calculates a difference between the predicted temperature of the battery 13 and the first battery temperature threshold T1 at each of start times of the second and subsequent cooling of the battery 13 and at the traveling end time of the vehicle 10 based on the updated temperature transition and temperature control plan of the battery 13 (step S34). Thereafter, the temperature control planning unit 140 returns to step S24 to determine whether the difference is larger than zero.

The temperature control planning unit 140 determines whether the difference calculated in step S34 is larger than zero (step S24). In the example shown in FIG. 9, the difference at the start time t2 of the second cooling is zero, but the difference at the traveling end time t3 is larger than zero, so that the process proceeds to step S26 (step S24: YES).

In step S26, the temperature control planning unit 140 calculates an excessive cooling amount Q2o' which is an excessive amount in the predicted cooling amount Q2' in the second cooling. In the example of FIG. 9, since there is no third and subsequent cooling, the excessive cooling amount is calculated based on the first battery temperature threshold T1 and the predicted temperature of the battery 13 at the traveling end time t3. More specifically, the excessive cooling amount is calculated based on the difference between the first battery temperature threshold T1 and the predicted temperature of the battery 13 at the traveling end time t3. Here, the excessive cooling amount Q2o' is calculated by the method described above with reference to FIG. 8 in a similar manner as the excessive cooling amount Q1o.

After step S26, the temperature control planning unit 140 subtracts the excessive cooling amount Q2o' from the predicted cooling amount Q2' in the second cooling to shorten the operation time of the temperature control device 30 (step S28). In other words, at the time of the second battery cooling, the cooling is ended before the battery temperature reaches the lower limit value T0_low in the normal temperature control. Accordingly, the power consumption associated with the second cooling performed by the temperature control device 30 can be reduced.

Figure 10:
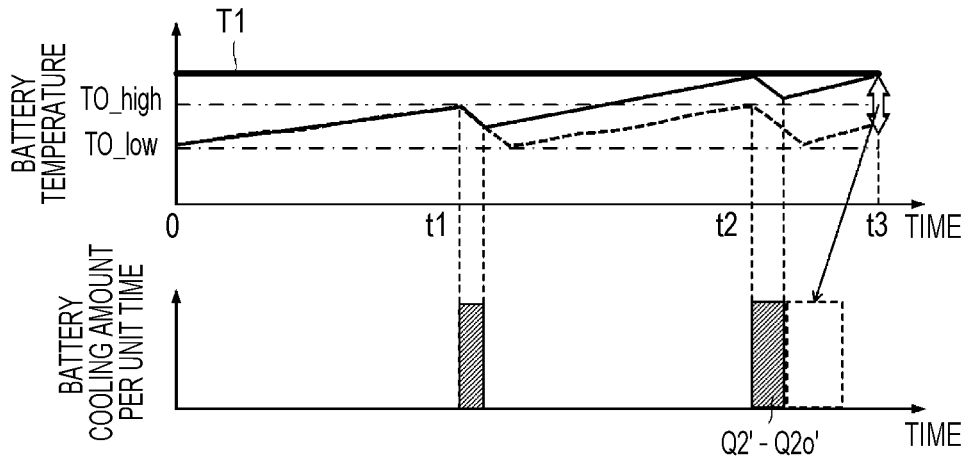
FIG. 10 is a graph in which the temperature transition and the temperature control plan of the battery 13 are updated in consideration of subtraction of an excessive cooling amount $Q2o'$ at the time of second cooling.

Next, the temperature control planning unit 140 updates the temperature transition and the temperature control plan of the battery 13 in consideration of the subtraction of the excessive cooling amount Q2o' (step S30). A solid line in an upper graph of FIG. 10 is the temperature transition of the battery 13 when the second cooling time is shortened in step S28. The temperature control planning unit 140 allows the battery temperature to exceed the upper limit value T0_high in the normal temperature control after the second cooling.

As described above, prevention of excessive cooling in the second battery cooling is completed. Before proceeding to step S34, 1 is added to the number of times n of calculations for the repeated calculation to be subsequently executed (step S32).

Next, the temperature control planning unit 140 calculates a difference between the predicted temperature of the battery 13 and the first battery temperature threshold T1 at the traveling end time of the vehicle 10 based on the updated temperature transition and temperature control plan of the battery 13 (step S34). If there are third and subsequent cooling of the battery 13, a difference between the predicted temperature of the battery 13 and the first battery temperature threshold T1 at each of start times of the third and subsequent cooling is calculated. Thereafter, the temperature control planning unit 140 returns to step S24 to determine whether the difference is larger than zero.

The temperature control planning unit 140 determines whether the difference calculated in step S34 is larger than zero (step S24). In the example shown in FIG. 10, since the difference at the traveling end time t3 (and the difference at the start time t2 of the second cooling) is zero (step S24: NO), the temperature control planning unit 140 ends the creation of the temperature control plan (step S36). If there are third and subsequent cooling of the battery 13, the temperature control planning unit 140 repeatedly executes steps S24 to S34 until a difference between the predicted temperature of the battery 13 and the first battery temperature threshold T1 at each of start times of the third and subsequent cooling and a difference between the predicted temperature of the battery 13 and the first battery temperature threshold T1 at the traveling end time are both zero.

Figure 11:
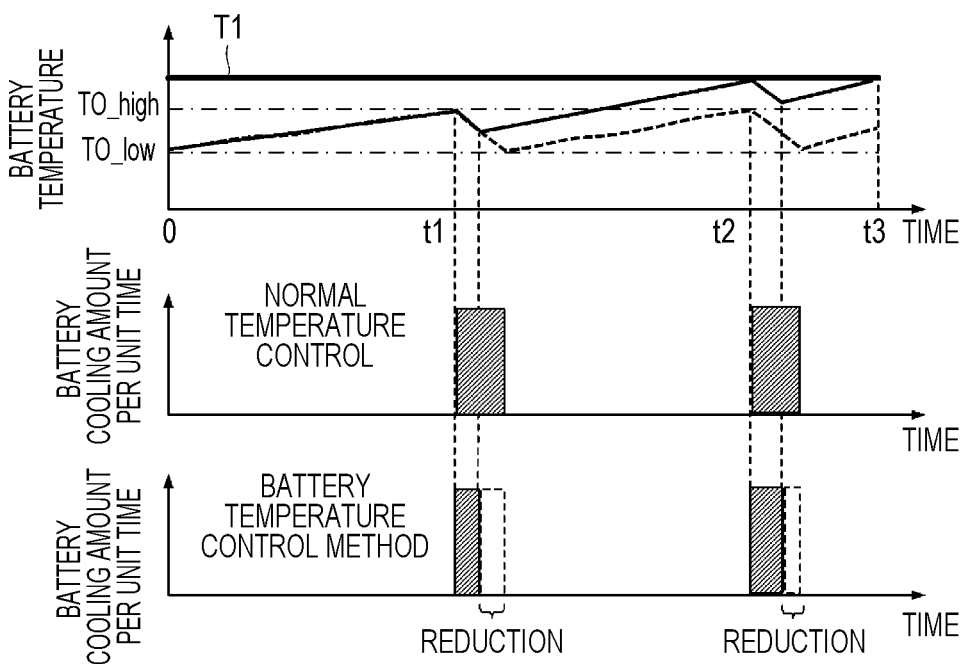
FIG. 11 is a graph for comparing the temperature control plan based on the normal temperature control and the temperature control plan based on the battery temperature control method of the present invention in the case of cooling the battery 13.

FIG. 11 is a graph for comparing the temperature control plan based on the normal temperature control and the temperature control plan based on the battery temperature control method of the present invention. As shown in FIG. 11, the predicted cooling amount based on the battery temperature control method of the present invention is smaller than the predicted cooling amount based on the normal temperature control. More specifically, the cooling time of the battery 13 is shorter in the battery temperature control method of the present invention than in the normal temperature control. Therefore, the power consumption of the battery 13 associated with the operation of the temperature control device 30 can be reduced. Accordingly, the cruising distance of the vehicle 10 can be increased.

The external server 100 transmits the temperature control plan to the vehicle 10 (step S38), and the control device 40 (the temperature control unit 410) cools the battery 13 according to the temperature control plan (step S40).

Battery Heating

Next, a case of heating the battery 13 will be described.

Figure 12:
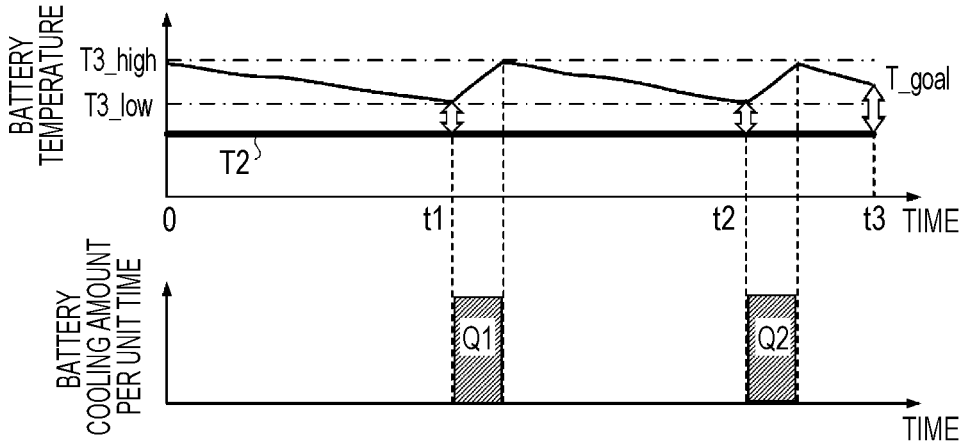
FIG. 12 is a graph showing a temperature transition (upper side) and a temperature control plan (lower side) of the battery 13 in a case of heating the battery 13 according to the normal temperature control.

FIG. 12 shows a battery temperature transition and a battery heating amount when execution of the normal temperature control is assumed in the case of heating the battery 13. For example, in a cold region where an outside air temperature is low (for example, a region where an outside air temperature is lower than a lower limit value T3_low or the low-temperature-side threshold T2 to be described later), the battery temperature may decrease even while the vehicle 10 is traveling. In the normal temperature control, when the battery temperature reaches the lower limit value T3_low, the control device 40 operates the temperature control device 30 to heat the battery 13 so as to prevent the battery temperature from falling below the lower limit value T3_low. More specifically, the control device 40 operates the heater 322 of the temperature control device 30 to heat the battery 13 until the battery temperature reaches an upper limit value T3_high. The battery heating amount is an amount of heat that the heater 322 can apply to the refrigerant of the battery temperature control circuit 32. In a lower graph of FIG. 12, a vertical axis represents a battery heating amount per unit time, and a product (that is, Q1 and Q2 in the graph) obtained by multiplying the battery heating amount per unit time by a heating time (an operation time of the temperature control device 30) corresponds to an amount of heat applied to the refrigerant of the battery temperature control circuit 32 by the heater 322.

Figure 4:
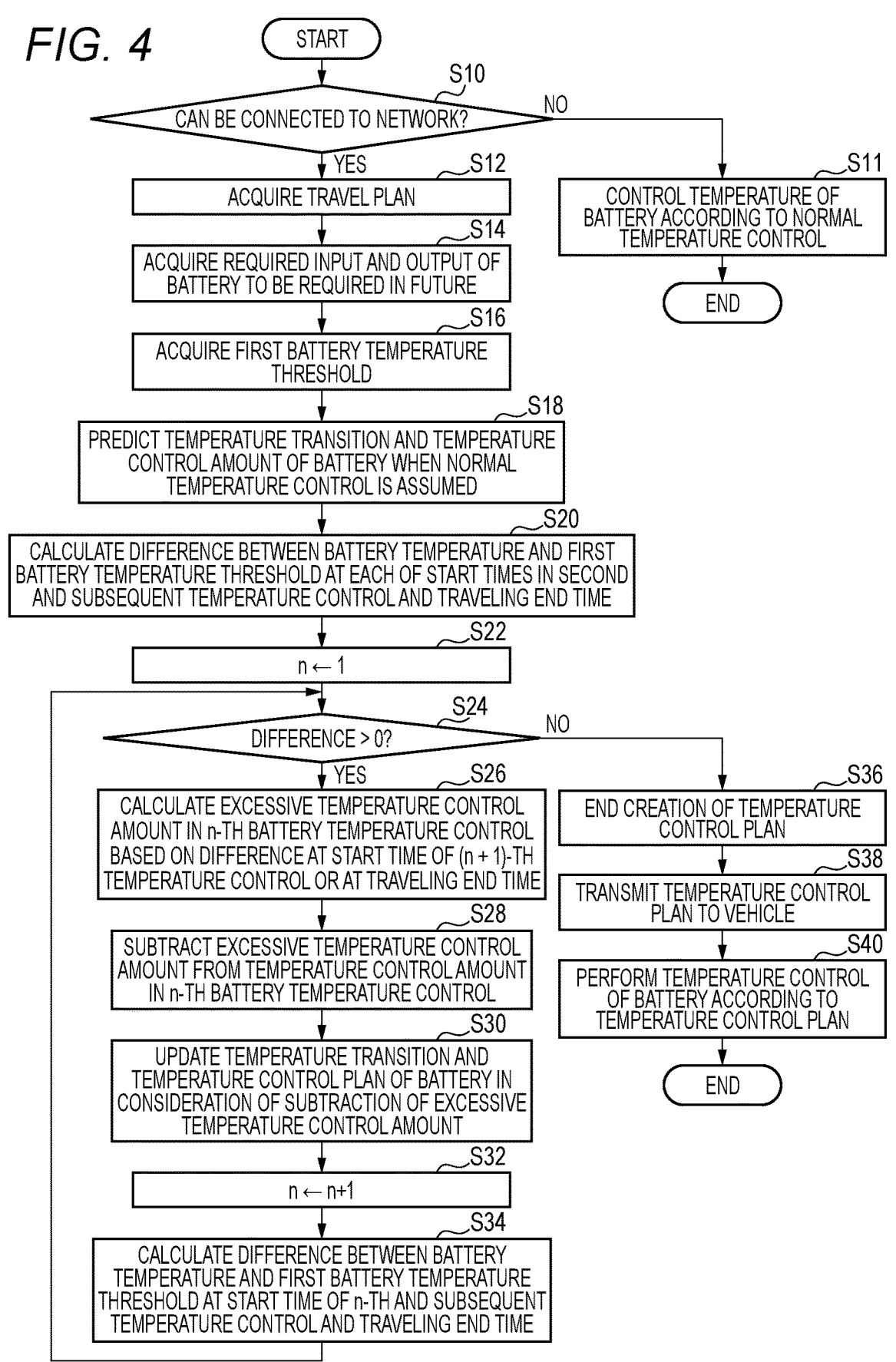
FIG. 4 is a diagram showing an example of a flow of a battery temperature control method of the present invention.

For the case of heating the battery 13, similar to the cooling of the battery 13, the battery temperature control method of the present invention is also executed according to the flow of FIG. 4. Step S10, S11, S12, and S14 are the same as those in the cooling of the battery 13, and description thereof will be omitted as appropriate.

After step S14, the target temperature acquisition unit 130 acquires the first battery temperature threshold that is the target temperature of the battery 13 at which the required input and output P[W] of the battery 13 is satisfied (step S16). In the case of heating the battery 13, the first battery temperature threshold is the above-described low-temperature-side threshold T2. That is, the target temperature acquisition unit 130 acquires the low-temperature-side threshold T2 based on the relationship between the battery temperature and the input and output (see FIG. 6) prepared in advance and the required input and output P of the battery 13 acquired in step S14, and sets the low-temperature-side threshold T2 as the first battery temperature threshold.

Next, when it is assumed that the temperature of the battery 13 is controlled by executing the normal temperature control, the temperature control planning unit 140 predicts the temperature transition of the battery 13 when the vehicle 10 travels according to the travel plan (step S18). The temperature control planning unit 140 predicts the temperature transition of the battery 13 based on the normal temperature control as shown in FIG. 12.

Further, in step S18, the temperature control planning unit 140 acquires a predicted temperature control amount of the battery 13 (here, a predicted heating amount) when it is assumed that the temperature of the battery 13 is controlled by executing the normal temperature control. As shown in the lower graph of FIG. 12, the predicted heating amount is a predicted value of the battery heating amount at the time of heating, and is calculated by multiplying the battery heating amount per unit time by an operation time of the temperature control device 30. When the heating of the battery 13 is performed a plurality of times, the temperature control planning unit 140 acquires the predicted heating amount at each time of heating. In the example of FIG. 12, it is scheduled that the battery 13 is heated twice while the vehicle 10 travels from the current location to the destination, and the predicted heating amounts in the first heating and the second heating are denoted by Q1 and Q2, respectively.

Next, the temperature control planning unit 140 calculates a difference between a predicted temperature of the battery 13 and the first battery temperature threshold T2 at each of start times of the second and subsequent heating of the battery 13 and a traveling end time of the vehicle 10 (step S20). In the example of FIG. 12, a difference T3_low–T2 between a predicted temperature T3_low of the battery 13 and the first battery temperature threshold T2 at a start time t2 of the second heating is calculated. Further, a difference T_goal–T2 between a predicted temperature T_goal of the battery 13 and the first battery temperature threshold T2 at a traveling end time t3 of the vehicle 10 is calculated.

Next, the temperature control planning unit 140 repeatedly performs the calculation so as to make the difference calculated in step S20 (a total value when the difference is calculated a plurality of times) zero, and updates the temperature transition and the temperature control plan of the battery as needed (step S22 to S34).

First, a first calculation (step S22: n=1) will be described. The temperature control planning unit 140 determines whether the difference calculated in step S20 is larger than zero (step S24). When the difference is zero (step S24: NO), the process proceeds to step S36. On the other hand, when the difference is larger than zero (step S24: YES), the process proceeds to step S26. In the example shown in FIG. 12, since the difference at the start time t2 of the second heating and the difference at the traveling end time t3 are larger than zero, the process proceeds to step S26.

In step S26, the temperature control planning unit 140 calculates an excessive heating amount Q1$o$ which is an excessive amount in the predicted heating amount Q1 in the first heating. The excessive heating amount is calculated based on the first battery temperature threshold T2 and the predicted temperature of the battery 13 at a start time of next heating (that is, the second heating). More specifically, the excessive heating amount is calculated based on a difference between the first battery temperature threshold T2 and the predicted temperature of the battery 13 at the start time of the next heating. When generalized using a natural number n, the excessive heating amount of n-th heating is calculated based on a difference between the first battery temperature threshold T2 and the predicted temperature of the battery 13 at a start time of (n+1)-th heating. Further, the excessive heating amount of the n-th heating is calculated based on the first battery temperature threshold T2 and the predicted temperature of the battery 13 at the traveling end time when there is no next heating.

Figure 13:
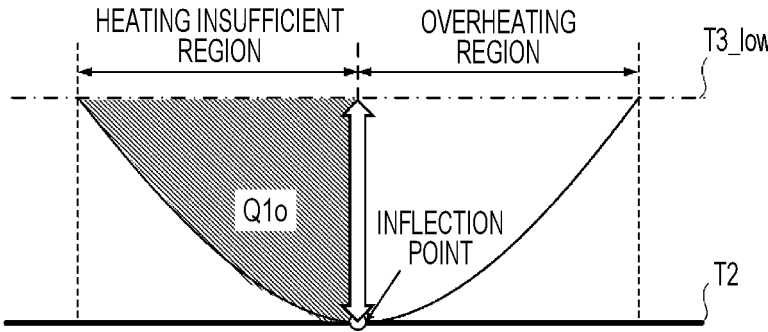
FIG. 13 is a diagram illustrating an excessive heating amount.

The excessive heating amount will be described in detail with reference to FIG. 13. FIG. 13 shows a graph of battery temperature prediction when the battery temperature reaches the first battery temperature threshold T2 without performing the second heating even when the battery temperature falls below the lower limit value T3_low after the first heating. As shown in FIG. 13, the excessive heating amount Q1$o$ corresponds to an area between the battery temperature prediction and the lower limit value T3_low from a time point when the battery temperature prediction falls below the lower limit value T3_low to a battery temperature inflection point.

After step S26, the temperature control planning unit 140 subtracts the excessive heating amount Q1$o$ from the predicted heating amount Q1 in the first heating to shorten the operation time of the temperature control device 30 (step S28). In other words, at the time of the first battery heating, the heating is ended before the battery temperature reaches the upper limit value T3_high in the normal temperature control. Accordingly, the power consumption associated with the first battery heating performed by the temperature control device 30 can be reduced.

Figure 14:
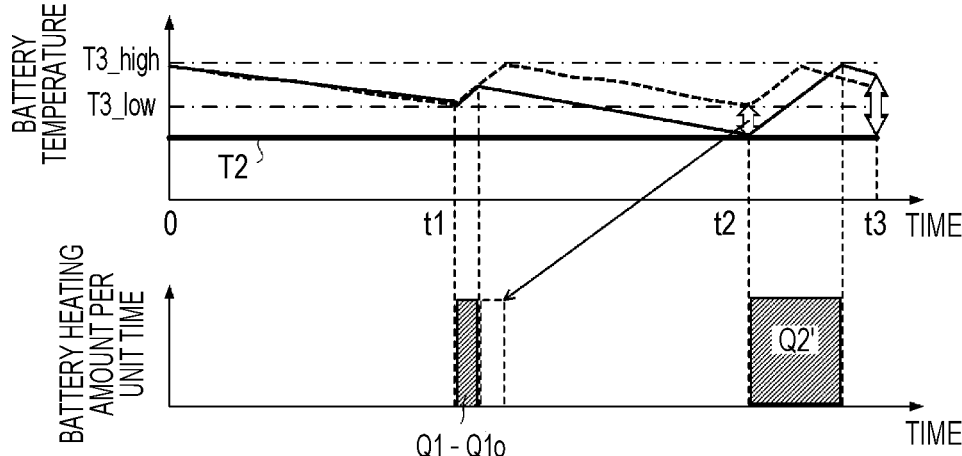
FIG. 14 is a graph in which the temperature transition and the temperature control plan of the battery 13 are updated in consideration of subtraction of an excessive heating amount Q1*o* at the time of first heating.

Next, the temperature control planning unit 140 updates the temperature transition and the temperature control plan of the battery 13 in consideration of the subtraction of the excessive heating amount Q1$o$ (step S30). A solid line in an upper graph of FIG. 14 is the temperature transition of the battery 13 in consideration of shortening the first heating time of the battery 13 in step S28. The temperature control planning unit 140 allows the battery temperature to fall below the lower limit value T3_low in the normal temperature control after the first heating, and the battery temperature reaches the first battery temperature threshold T2 when the second heating is started. Since the temperature transition and the temperature control plan of the battery 13 are updated in consideration of the subtraction of the excessive heating amount Q1$o$, the predicted heating amount Q2 in the second heating is updated to Q2'.

As described above, prevention of excessive heating in the first battery heating is completed. Before proceeding to step S34, 1 is added to the number of times n of calculations for the repeated calculation to be subsequently executed (step S32).

Next, the temperature control planning unit 140 calculates a difference between the predicted temperature of the battery 13 and the first battery temperature threshold T2 at each of start times of the second and subsequent heating of the battery 13 and at the traveling end time of the vehicle 10 based on the updated temperature transition and temperature control plan of the battery 13 (step S34). Thereafter, the temperature control planning unit 140 returns to step S24 to determine whether the difference is larger than zero.

The temperature control planning unit 140 determines whether the difference calculated in step S34 is larger than zero (step S24). In the example shown in FIG. 14, the difference at the start time t2 of the second heating is zero, but the difference at the traveling end time t3 is larger than zero, so that the process proceeds to step S26 (step S24. YES).

In step S26, the temperature control planning unit 140 calculates an excessive heating amount Q2$o$' which is an excessive amount in the predicted heating amount Q2' in the second heating. In the example of FIG. 14, since there is no third and subsequent heating, the excessive heating amount is calculated based on the first battery temperature threshold T2 and the predicted temperature of the battery 13 at the traveling end time t3. More specifically, the excessive heating amount is calculated based on the difference between the first battery temperature threshold T2 and the predicted temperature of the battery 13 at the traveling end time t3. The excessive heating amount Q2$o$' is calculated by the method described above with reference to FIG. 13 in a similar manner as the excessive heating amount Q1$o$.

After step S26, the temperature control planning unit 140 subtracts the excessive heating amount Q2$o$' from the predicted heating amount Q2' in the second heating to shorten the operation time of the temperature control device 30 (step S28). In other words, at the time of the second battery heating, the heating is ended before the battery temperature reaches the upper limit value T3_high in the normal temperature control. Accordingly, the power consumption associated with the second heating performed by the temperature control device 30 can be reduced.

Figure 15:
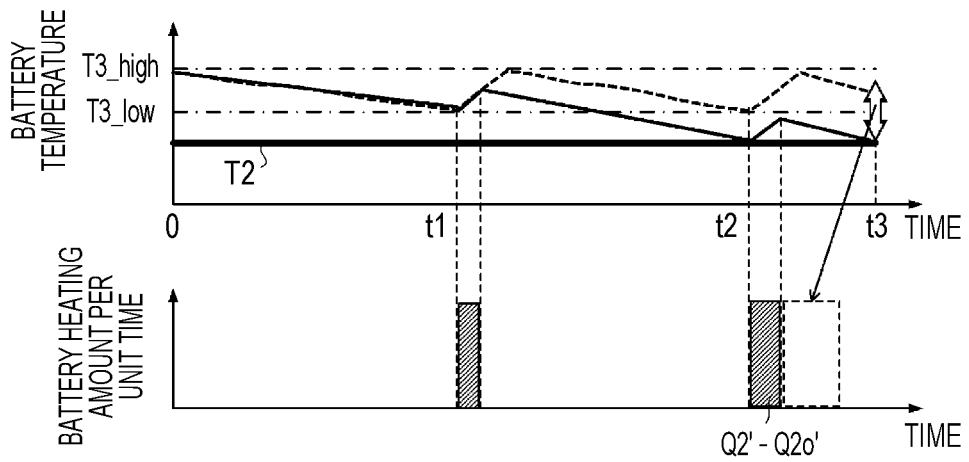
FIG. 15 is a graph in which the temperature transition and the temperature control plan of the battery 13 are updated in consideration of subtraction of an excessive heating amount Q2*o'* at the time of second heating.

Next, the temperature control planning unit 140 updates the temperature transition and the temperature control plan of the battery 13 in consideration of the subtraction of the excessive heating amount Q2$o$' (step S30). A solid line in an upper graph of FIG. 15 is the temperature transition of the battery 13 when the second heating time is shortened in step S28. The temperature control planning unit 140 allows the battery temperature to fall below the lower limit value T3_low in the normal temperature control after the second heating.

As described above, prevention of excessive heating in the second battery heating is completed. Before proceeding to step S34, 1 is added to the number of times n of calculations for the repeated calculation to be subsequently executed (step S32).

Next, the temperature control planning unit 140 calculates a difference between the predicted temperature of the battery 13 and the first battery temperature threshold T2 at the traveling end time of the vehicle 10 based on the updated temperature transition and temperature control plan of the battery 13 (step S34). If there are third and subsequent heating of the battery 13, a difference between the predicted temperature of the battery 13 and the first battery temperature threshold T2 at each of start times of the third and subsequent heating is calculated. Thereafter, the temperature control planning unit 140 returns to step S24 to determine whether the difference is larger than zero.

The temperature control planning unit 140 determines whether the difference calculated in step S34 is larger than zero (step S24). In the example shown in FIG. 15, since the difference at the traveling end time t3 (and the difference at the start time t2 of the second heating) is zero (step S24: NO), the temperature control planning unit 140 ends the creation of the temperature control plan (step S36). If there are third and subsequent heating of the battery 13, the temperature control planning unit 140 repeatedly executes steps S24 to S34 until a difference between the predicted temperature of the battery 13 and the first battery temperature threshold T2 at each of start times of the third and subsequent heating and a difference between the predicted temperature of the battery 13 and the first battery temperature threshold T2 at the traveling end time are both zero.

Figure 16:
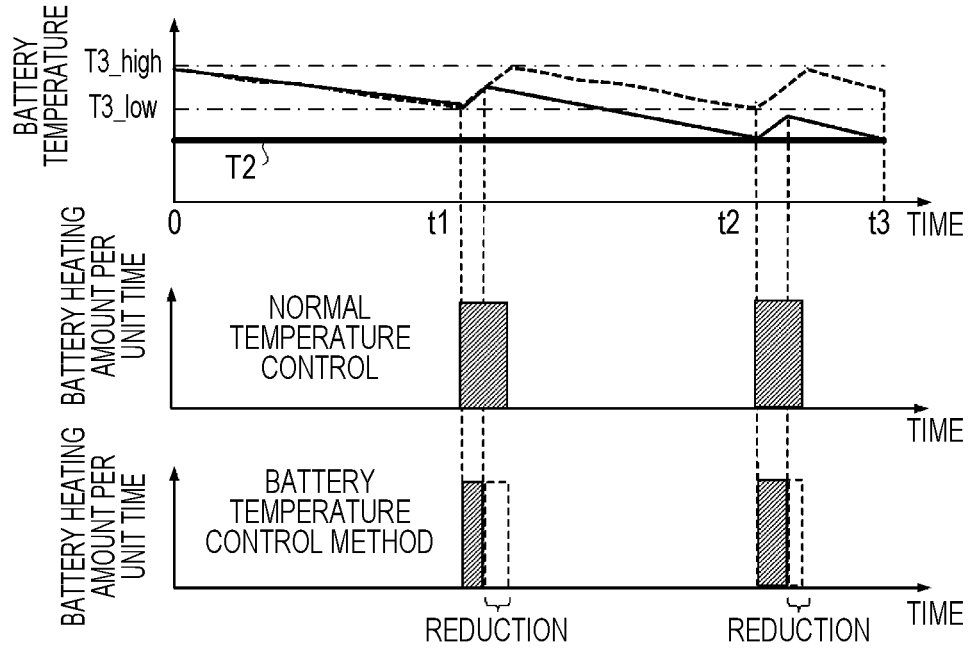
FIG. 16 is a graph for comparing the temperature control plan based on the normal temperature control and the temperature control plan based on the battery temperature control method of the present invention in the case of heating the battery 13.

FIG. 16 is a graph for comparing the temperature control plan based on the normal temperature control and the temperature control plan based on the battery temperature control method of the present invention. As shown in FIG. 16, the predicted heating amount based on the battery temperature control method of the present invention is smaller than the predicted heating amount based on the normal temperature control. More specifically, the heating time of the battery 13 is shorter in the battery temperature control method of the present invention than in the normal temperature control. Therefore, the power consumption of the battery 13 associated with the operation of the temperature control device 30 can be reduced. Accordingly, the cruising distance of the vehicle 10 can be increased.

The external server 100 transmits the temperature control plan to the vehicle 10 (step S38), and the control device 40 (the temperature control unit 410) heats the battery 13 according to the temperature control plan (step S40).

First Modification

In the above-described embodiment, the temperature control planning unit 140 calculates the excessive temperature control amount (the excessive cooling amount and the excessive heating amount) based on the first battery temperature threshold T1, T2 and the predicted temperature of the battery 13. The temperature control planning unit 140 may acquire a second battery temperature threshold T1A. T2A obtained by modifying the first battery temperature threshold T1, T2 based on characteristics of the battery temperature sensor 14, and calculate the excessive temperature control amount based on the second battery temperature threshold T1A, T2A and the predicted temperature of the battery 13. Specifically, the excessive temperature control amount may be calculated based on a difference between the second battery temperature threshold T1A, T2A and the predicted temperature of the battery 13.

In more detailed description of the second battery temperature thresholds T1A, T2A, the second battery temperature thresholds T1A, T2A are respectively values obtained by correcting the first battery temperature thresholds T1, T2 in consideration of a variation α (that is, a detection error of the battery temperature sensor 14) included in the detection result of the battery temperature sensor 14. The second battery temperature thresholds T1A, T2A are obtained by subtracting or adding the variation α from or to the first battery temperature thresholds T1, T2, and specifically, T1A=T1—a on the high temperature side and T2A=T2+a on the low temperature side. The second battery temperature threshold T1A is higher than the predetermined temperature range in the normal temperature control, and the second battery temperature threshold T2A is lower than the predetermined temperature range in the normal temperature control.

Since the second battery temperature thresholds T1A, T2A are based on the characteristics of the battery temperature sensor 14, the temperature control planning unit 140 can more accurately calculate the excessive temperature control amount. Further, the required input and output P of the battery 13 is more reliably satisfied, and the power consumption of the battery 13 associated with the operation of the temperature control device 30 is reduced more than when the temperature of the battery 13 is controlled according to the normal temperature control.

Figure 17:
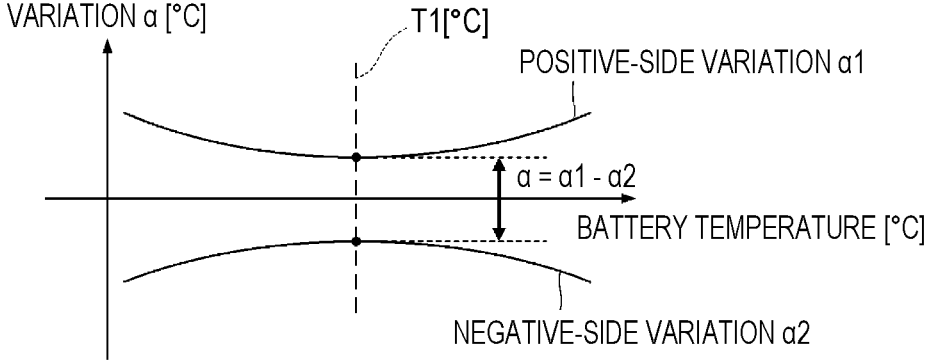
FIG. 17 is a graph showing a relationship between a battery temperature and variations included in a detection result of a battery temperature sensor 14.

Here, the variation α will be described in detail. FIG. 17 is a graph showing a relationship between the battery temperature [° C.] and the variation α [° C.] included in the detection result of the battery temperature sensor 14. In the following description, the battery temperature detected by the battery temperature sensor 14 is also referred to as a detected temperature.

In FIG. 17, a positive-side variation α1 indicates how much the actual battery temperature can be higher than the detected temperature, and a negative-side variation α2 indicates how much the actual battery temperature can be lower than the detected temperature. The variation α is expressed by a difference ($\alpha=\alpha1-\alpha2$) between the positive-side variation α1 and the negative-side variation α2. For example, when the detected temperature is 35° C. (a temperature of an example of the first battery temperature threshold T1), the positive-side variation α1 at 35° C. is +1° C., and the negative-side variation α2 at 35° C. is −1° C., the actual battery temperature is estimated to be in a range of 34° C. to 36° C., and the variation α at this time is calculated as 2° C.

As shown in FIG. 17, values of the positive-side variation α1 and the negative-side variation α2 vary depending on the battery temperature, that is, the variation α varies depending on the battery temperature. Specifically, the variation α takes a minimum value in a certain battery temperature range, and the value increases toward a higher temperature side and a lower temperature side from the temperature range. Therefore, when the first battery temperature threshold T1 (see FIG. 6) at which the required input and output P[W] of the battery 13 is satisfied is set, the variation α may increase as the first battery temperature threshold T1 is set to a larger value. Similarly, when the first battery temperature threshold T2 (see FIG. 6) at which the required input and output P[W] of the battery 13 is satisfied is set, the variation α may increase as the first battery temperature threshold T2 is set to a smaller value.

As described above, in the present modification, the temperature control planning unit 140 calculates the excessive temperature control amount based on the second battery temperature threshold T1A, T2A obtained by correcting the first battery temperature threshold T1, T2. Accordingly, even in a temperature range in which the variation α of the battery temperature sensor 14 is large, the required input and output P of the battery 13 is more reliably satisfied. Then, the power consumption of the battery 13 associated with the operation of the temperature control device 30 is less than when the temperature of the battery 13 is controlled according to the normal temperature control. Further, in a temperature range in which the variation α of the battery temperature sensor 14 is small, the second battery temperature threshold T1A can be set to be higher and the second battery temperature threshold T2A can be set to be lower as compared with those in a temperature range in which the variation α is large. Accordingly, the power consumption of the battery 13 associated with the operation of the temperature control device 30 is reduced more as compared with that in the temperature range in which the variation α is large.

The battery temperature control method described in the above embodiment can be realized by, for example, executing a program prepared in advance by a computer (processor). The program is executed by being stored in a computer-readable storage medium and read from the storage medium. Further, the program may be provided in a form stored in a non-transitory storage medium such as a flash memory, or may be provided via a network such as the Internet.

Although the embodiments of the present invention have been described above, the present invention is not limited to the embodiments, and various modifications and substitutions can be made without departing from the gist of the present invention.

In the above-described embodiment, the information processing device 2 that performs the calculation processing in the battery temperature control method includes the control device 40 and the external server 100, but is not limited thereto. The information processing device 2 may include only the control device 40. In this case, step S10 in FIG. 4 is omitted. Further, the travel plan is acquired in step S12 by, for example, the navigation device 18, the user terminal, or the like, and is transmitted to the control device 40.

In the above-described embodiment, the external server 100 includes the travel plan acquisition unit 110, the battery input and output acquisition unit 120, the target temperature acquisition unit 130, and the temperature control planning unit 140, but is not limited thereto. The control device 40 may include a part of these components.

In the above-described embodiment, the predicted temperature of the battery 13 and the first battery temperature threshold T1. T2 at a temperature control start time (the cooling start time/heating start time) and the traveling end time are acquired, and the difference therebetween is calculated, but the invention is not limited thereto. For example, when the temperature control start and the traveling end are not specified by time but by a position on the travel route, the predicted temperature of the battery 13 and the first battery temperature threshold T1, T2 at a temperature control start position and a traveling end position predicted on the travel route may be acquired (step S16), and a difference therebetween may be calculated (steps S20, S34).

Figure 18:
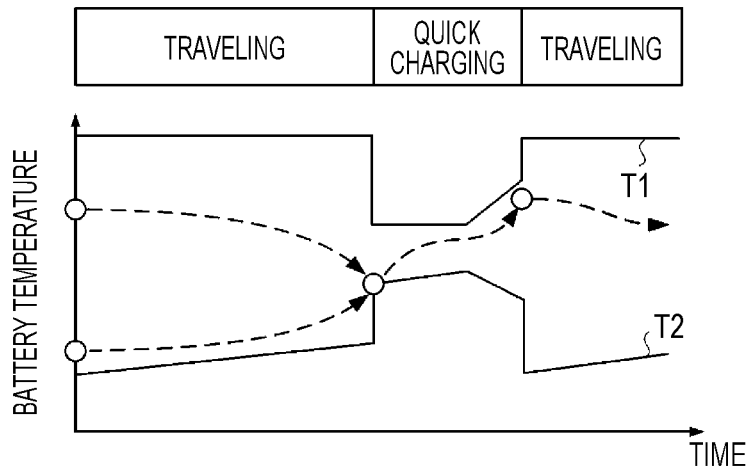
FIG. 18 is a graph showing the temperature transition of the battery 13 when charging is included in a travel plan.

In the above-described embodiment, when the travel plan includes charging of the battery 13 by the external power supply 200, the temperature control planning unit 140 may predict the temperature transition of the battery 13 such that the temperature of the battery 13 at the start of charging is the low-temperature-side threshold T2, as shown in FIG. 18. That is, the temperature control planning unit 140 may create a temperature control plan in which the temperature of the battery 13 at the start of charging is the low-temperature-side threshold T2. Thereby, a temperature control plan can be created in consideration of a temperature increase of the battery 13 due to the charging.

In the present description, at least the following matters are described. Although corresponding constituent elements or the like in the above-described embodiments are shown in parentheses, the present invention is not limited thereto.

1. A battery temperature control method for controlling a temperature of a battery (battery 13) mounted on a vehicle (vehicle 10) by a temperature control device (temperature control device 30), the method including:

a travel plan acquisition step (step S12) of acquiring a travel plan of the vehicle;

a battery input and output acquisition step (step S14) of acquiring a required input and output of the battery predicted when the vehicle travels according to the travel plan;

a target temperature acquisition step (step S16) of acquiring a first battery temperature threshold (first battery temperature threshold T1, T2) which is a target temperature of the battery at which the required input and output is satisfied;

a battery temperature transition prediction step (step S18) of predicting a temperature transition of the battery when the vehicle travels according to the travel plan in a case where it is assumed that normal temperature control for controlling a temperature of the battery is executed such that the temperature of the battery is in a predetermined temperature range;

a temperature control amount prediction step (step S18) of acquiring a predicted temperature control amount of the battery at a first time or a first position in the travel plan in the case where it is assumed that the normal temperature control is executed;

an excessive temperature control amount calculation step (step S26) of calculating an excessive temperature control amount, which is an excessive amount in the predicted temperature control amount, based on the first battery temperature threshold and a predicted temperature of the battery at a second time later than the first time or a second position ahead of the first position;

a temperature control restriction step (step S28) of subtracting the excessive temperature control amount from the predicted temperature control amount at the first time or the first position and shortening an operation time of the temperature control device; and a temperature control step (step S40) of controlling the temperature of the battery by operating the temperature control device.

According to the above (1), since the excessive temperature control amount is subtracted from the predicted temperature control amount of the battery in the case where it is assumed that the normal temperature control is executed while the vehicle is traveling, and the operation time of the temperature control device is shortened, the power consumption of the battery associated with the operation of the temperature control device can be reduced. Accordingly, a cruising distance of the vehicle can be increased.

(2) The battery temperature control method described in the above (1), in which the excessive temperature control amount is an amount calculated based on a difference between the first battery temperature threshold and the predicted temperature of the battery at the second time or the second position.

According to the above (2), the excessive temperature control amount at the first time or the first position can be calculated based on the difference between the first battery temperature threshold and the predicted temperature of the battery at the second time or the second position.

(3) The battery temperature control method described in the above (1) or (2), in which the battery is provided with a battery temperature sensor (battery temperature sensor 14) configured to acquire the temperature of the battery, in the target temperature acquisition step, a second battery temperature threshold (second battery temperature threshold T1A, T2A) obtained by correcting the first battery temperature threshold based on characteristics of the battery temperature sensor is acquired, and in the excessive temperature control amount calculation step, the excessive temperature control amount is calculated based on the second battery temperature threshold and the predicted temperature of the battery at the second time or the second position.

According to the above (3), the excessive temperature control amount can be accurately calculated by using the second battery temperature threshold in consideration of the characteristics of the battery temperature sensor.

(4) The battery temperature control method described in any one of the above (1) to (3), in which the vehicle includes a control device (control device 40) configured to control the temperature control device, and a communication device (communication device 17) configured to communicate with an external server (external server 100) and transmit an output of the external server to the control device, and at least one of the steps included in the battery temperature control method is executed by the external server.

According to the above (4), the battery temperature control method can be executed by the external server.

(5) The battery temperature control method described in the above (4), in which when the communication device is not able to communicate with the external server, the control device controls the temperature control device to control the temperature of the battery according to the normal temperature control.

According to the above (5), even when the control device cannot communicate with the external server, the temperature of the battery can be controlled according to the normal temperature control, so that the deterioration of a battery capacity due to the inability to control the temperature of the battery can be prevented.

(6) The battery temperature control method described in any one of the above (1) to (5), in which the first battery temperature threshold includes a high-temperature-side threshold (high-temperature-side threshold T1) and a low-temperature-side threshold (low-temperature-side threshold T2) which is a temperature lower than the high-temperature-side threshold.

According to the above (6), on both the high temperature side and the low temperature side, it is possible to subtract the excessive temperature control amount from the predicted temperature control amount and shorten the operation time of the temperature control device.

(7) The battery temperature control method described in the above (6), in which the battery is chargeable by electric power from an external power supply (external power supply 200), and when the travel plan includes charging of the battery with the external power supply, in the battery temperature transition prediction step, the temperature transition of the battery is predicted such that the temperature of the battery at a start of the charging is the low-temperature-side threshold.

According to the above (7), a temperature control plan in consideration of an increase in the temperature of the battery due to charging with the external power supply can be created.

(8) The battery temperature control method according to any one of the above (1) to (7), in which the first battery temperature threshold is set to be higher than the predetermined temperature range which is based on the normal temperature control, in the temperature control amount prediction step, a predicted cooling amount of the battery at the first time or the first position in the travel plan in the case where it is assumed that the normal temperature control is executed is predicted, in the excessive temperature control amount calculation step, an excessive cooling amount which is an excessive cooling amount in the predicted cooling amount is calculated based on the first battery temperature threshold and the predicted temperature of the battery at the second time or the second position, and in the temperature control restriction step, the excessive cooling amount is subtracted from the predicted cooling amount of the battery at the first time or the first position, and the operation time of the temperature control device is shortened.

According to the above (8), since the excessive cooling amount is subtracted from the predicted cooling amount of the battery in the case where it is assumed that the normal temperature control is executed while the vehicle is traveling, and the operation time of the temperature control device is shortened, the power consumption of the battery associated with the operation of the temperature control device can be reduced. Accordingly, a cruising distance of the vehicle can be increased.

(9) The battery temperature control method described in the above (1) to (8), in which the first battery temperature threshold is set to be lower than the predetermined temperature range which is based on the normal temperature control, in the temperature control amount prediction step, a predicted heating amount of the battery at the first time or the first position in the travel plan in the case where it is assumed that the normal temperature control is executed is predicted, in the excessive temperature control amount calculation step, an excessive heating amount which is an excessive heating amount in the predicted heating amount is calculated based on the first battery temperature threshold and the predicted temperature of the battery at the second time or the second position, and in the temperature control restriction step, the excessive heating amount is subtracted from the predicted heating amount of the battery at the first time or the first position, and the operation time of the temperature control device is shortened.

According to the above (9), since the excessive heating amount is subtracted from the predicted heating amount of the battery in the case where it is assumed that the normal temperature control is executed while the vehicle is traveling in a cold region, for example, and the operation time of the temperature control device is shortened, the power consumption of the battery associated with the operation of the temperature control device can be reduced. Accordingly, a cruising distance of the vehicle can be increased.

(10) A battery temperature control system (battery temperature control system 1) including:

a temperature control device (temperature control device 30) configured to control a temperature of a battery (battery 13) mounted on a vehicle (vehicle 10); and an information processing device (information processing device 2) configured to control the temperature control device, in which the information processing device includes:

a travel plan acquisition unit (travel plan acquisition unit 110) configured to acquire a travel plan of the vehicle, a battery input and output acquisition unit (battery input and output acquisition unit 120) configured to acquire a required input and output of the battery predicted when the vehicle travels according to the travel plan, a target temperature acquisition unit (target temperature acquisition unit 130) configured to acquire a first battery temperature threshold which is a target temperature of the battery at which the required input and output is satisfied, a temperature control planning unit (temperature control planning unit 140) configured to create a temperature control plan of the battery when the vehicle travels according to the travel plan, and a temperature control unit (temperature control unit 410) configured to control the temperature of the battery by operating the temperature control device, and the temperature control planning unit is configured to;

predict a temperature transition of the battery when the vehicle travels according to the travel plan in a case where it is assumed that normal temperature control for controlling the temperature of the battery is executed such that the temperature of the battery is in a predetermined temperature range, acquire a predicted temperature control amount of the battery at a first time or a first position in the travel plan in the case where it is assumed that the normal temperature control is executed, calculate an excessive temperature control amount, which is an excessive amount in the predicted temperature control amount, based on the first battery temperature threshold and a predicted temperature of the battery at a second time later than the first time or a second position ahead of the first position, and subtract the excessive temperature control amount from the predicted temperature control amount at the first time or the first position and shorten an operation time of the temperature control device.

According to the above (10), since the excessive temperature control amount is subtracted from the predicted temperature control amount of the battery in the case where it is assumed that the normal temperature control is executed while the vehicle is traveling, and the operation time of the temperature control device is shortened, the power consumption of the battery associated with the operation of the temperature control device can be reduced. Accordingly, a cruising distance of the vehicle can be increased.

What is claimed is:

1. A battery temperature control method for controlling a temperature of a battery mounted on a vehicle by a temperature control device, the method comprising:

a travel plan acquisition step of acquiring a travel plan of the vehicle;

a battery input and output acquisition step of acquiring a required input and output of the battery predicted when the vehicle travels according to the travel plan;

a target temperature acquisition step of acquiring a first battery temperature threshold which is a target temperature of the battery at which the required input and output is satisfied;

a battery temperature transition prediction step of predicting a temperature transition of the battery when the vehicle travels according to the travel plan in a case where it is assumed that normal temperature control for controlling a temperature of the battery is executed such that the temperature of the battery is in a predetermined temperature range;

a temperature control amount prediction step of acquiring a predicted temperature control amount of the battery at a first time or a first position in the travel plan in the case where it is assumed that the normal temperature control is executed;

an excessive temperature control amount calculation step of calculating an excessive temperature control amount, which is an excessive amount in the predicted temperature control amount, based on the first battery temperature threshold and a predicted temperature of the battery at a second time later than the first time or a second position ahead of the first position;

a temperature control restriction step of subtracting the excessive temperature control amount from the predicted temperature control amount at the first time or the first position and shortening an operation time of the temperature control device; and a temperature control step of controlling the temperature of the battery by operating the temperature control device, wherein the battery is provided with a battery temperature sensor configured to acquire the temperature of the battery, in the target temperature acquisition step, a second battery temperature threshold obtained by correcting the first battery temperature threshold based on characteristics of the battery temperature sensor is acquired, and in the excessive temperature control amount calculation step, the excessive temperature control amount is calculated based on the second battery temperature threshold and the predicted temperature of the battery at the second time or the second position.

2. A battery temperature control method for controlling a temperature of a battery mounted on a vehicle by a temperature control device, the method comprising:

a travel plan acquisition step of acquiring a travel plan of the vehicle;

a battery input and output acquisition step of acquiring a required input and output of the battery predicted when the vehicle travels according to the travel plan;

a target temperature acquisition step of acquiring a first battery temperature threshold which is a target temperature of the battery at which the required input and output is satisfied;

a battery temperature transition prediction step of predicting a temperature transition of the battery when the vehicle travels according to the travel plan in a case where it is assumed that normal temperature control for controlling a temperature of the battery is executed such that the temperature of the battery is in a predetermined temperature range;

a temperature control amount prediction step of acquiring a predicted temperature control amount of the battery at a first time or a first position in the travel plan in the case where it is assumed that the normal temperature control is executed;

an excessive temperature control amount calculation step of calculating an excessive temperature control amount, which is an excessive amount in the predicted temperature control amount, based on the first battery temperature threshold and a predicted temperature of the battery at a second time later than the first time or a second position ahead of the first position;

a temperature control restriction step of subtracting the excessive temperature control amount from the predicted temperature control amount at the first time or the first position and shortening an operation time of the temperature control device; and a temperature control step of controlling the temperature of the battery by operating the temperature control device, wherein the vehicle includes a control device configured to control the temperature control device, and a communication device configured to communicate with an external server and transmit an output of the external server to the control device, and at least one of the steps included in the battery temperature control method is executed by the external server.

3. The battery temperature control method according to claim 2, wherein the excessive temperature control amount is an amount calculated based on a difference between the first battery temperature threshold and the predicted temperature of the battery at the second time or the second position.

4. The battery temperature control method according to claim 2, wherein when the communication device is not able to communicate with the external server, the control device controls the temperature control device to control the temperature of the battery according to the normal temperature control.

5. The battery temperature control method according to claim 4, wherein the first battery temperature threshold is set to be higher than the predetermined temperature range which is based on the normal temperature control, in the temperature control amount prediction step, a predicted cooling amount of the battery at the first time or the first position in the travel plan in the case where it is assumed that the normal temperature control is executed is predicted, in the excessive temperature control amount calculation step, an excessive cooling amount which is an excessive cooling amount in the predicted cooling amount is calculated based on the first battery temperature threshold and the predicted temperature of the battery at the second time or the second position, and in the temperature control restriction step, the excessive cooling amount is subtracted from the predicted cooling amount of the battery at the first time or the first position, and the operation time of the temperature control device is shortened.

6. The battery temperature control method according to claim 4, wherein the first battery temperature threshold is set to be lower than the predetermined temperature range which is based on the normal temperature control, in the temperature control amount prediction step, a predicted heating amount of the battery at the first time or the first position in the travel plan in the case where it is assumed that the normal temperature control is executed is predicted, in the excessive temperature control amount calculation step, an excessive heating amount which is an excessive heating amount in the predicted heating amount is calculated based on the first battery temperature threshold and the predicted temperature of the battery at the second time or the second position, and in the temperature control restriction step, the excessive heating amount is subtracted from the predicted heating amount of the battery at the first time or the first position, and the operation time of the temperature control device is shortened.

7. A battery temperature control method for controlling a temperature of a battery mounted on a vehicle by a temperature control device, the method comprising:

a travel plan acquisition step of acquiring a travel plan of the vehicle;

a battery input and output acquisition step of acquiring a required input and output of the battery predicted when the vehicle travels according to the travel plan;

a target temperature acquisition step of acquiring a first battery temperature threshold which is a target temperature of the battery at which the required input and output is satisfied;

a battery temperature transition prediction step of predicting a temperature transition of the battery when the vehicle travels according to the travel plan in a case where it is assumed that normal temperature control for controlling a temperature of the battery is executed such that the temperature of the battery is in a predetermined temperature range;

a temperature control amount prediction step of acquiring a predicted temperature control amount of the battery at a first time or a first position in the travel plan in the case where it is assumed that the normal temperature control is executed;

an excessive temperature control amount calculation step of calculating an excessive temperature control amount, which is an excessive amount in the predicted temperature control amount, based on the first battery temperature threshold and a predicted temperature of the battery at a second time later than the first time or a second position ahead of the first position;

a temperature control restriction step of subtracting the excessive temperature control amount from the predicted temperature control amount at the first time or the first position and shortening an operation time of the temperature control device; and a temperature control step of controlling the temperature of the battery by operating the temperature control device, wherein the first battery temperature threshold includes a high-temperature-side threshold and a low-temperature-side threshold which is a temperature lower than the high-temperature-side threshold, the battery is chargeable by electric power from an external power supply, and when the travel plan includes charging of the battery with the external power supply, in the battery temperature transition prediction step, the temperature transition of the battery is predicted such that the temperature of the battery at a start of the charging is the low-temperature-side threshold.

8. A battery temperature control system comprising:

a temperature control device configured to control a temperature of a battery mounted on a vehicle; and an information processing device configured to control the temperature control device, wherein the information processing device includes:

a travel plan acquisition unit configured to acquire a travel plan of the vehicle, a battery input and output acquisition unit configured to acquire a required input and output of the battery predicted when the vehicle travels according to the travel plan, a target temperature acquisition unit configured to acquire a first battery temperature threshold which is a target temperature of the battery at which the required input and output is satisfied, a temperature control planning unit configured to create a temperature control plan of the battery when the vehicle travels according to the travel plan, and a temperature control unit configured to control the temperature of the battery by operating the temperature control device, and the temperature control planning unit is configured to:

predict a temperature transition of the battery when the vehicle travels according to the travel plan in a case where it is assumed that normal temperature control for controlling the temperature of the battery is executed such that the temperature of the battery is in a predetermined temperature range, acquire a predicted temperature control amount of the battery at a first time or a first position in the travel plan in the case where it is assumed that the normal temperature control is executed, calculate an excessive temperature control amount, which is an excessive amount in the predicted temperature control amount, based on the first battery temperature threshold and a predicted temperature of the battery at a second time later than the first time or a second position ahead of the first position, and subtract the excessive temperature control amount from the predicted temperature control amount at the first time or the first position and shorten an operation time of the temperature control device, wherein the battery is provided with a battery temperature sensor configured to acquire the temperature of the battery, the target temperature acquisition unit is further configured to acquire a second battery temperature threshold obtained by correcting the first battery temperature threshold based on characteristics of the battery temperature sensor, and the temperature control planning unit is further configured to calculate the excessive temperature control amount based on the second battery temperature threshold and the predicted temperature of the battery at the second time or the second position.

9. A battery temperature control system comprising:

a temperature control device configured to control a temperature of a battery mounted on a vehicle, the vehicle including a control device configured to control the temperature control device, and a communication device configured to communicate with an external server and transmit an output of the external server to the control device; and an information processing device configured to control the temperature control device, wherein the information processing device is configured to:

(a) acquire a travel plan of the vehicle, (b) acquire a required input and output of the battery predicted when the vehicle travels according to the travel plan, (c) acquire a first battery temperature threshold which is a target temperature of the battery at which the required input and output is satisfied, (d) create a temperature control plan of the battery when the vehicle travels according to the travel plan, (e) control the temperature of the battery by operating the temperature control device, (f) predict a temperature transition of the battery when the vehicle travels according to the travel plan in a case where it is assumed that normal temperature control for controlling the temperature of the battery is executed such that the temperature of the battery is in a predetermined temperature range, (g) acquire a predicted temperature control amount of the battery at a first time or a first position in the travel plan in the case where it is assumed that the normal temperature control is executed, (h) calculate an excessive temperature control amount, which is an excessive amount in the predicted temperature control amount, based on the first battery temperature threshold and a predicted temperature of the battery at a second time later than the first time or a second position ahead of the first position, and (i) subtract the excessive temperature control amount from the predicted temperature control amount at the first time or the first position and shorten an operation time of the temperature control device, and wherein at least one of (a), (b), (c), (d), (e), (f), (g), (h), or (i) is executed via the external server.

10. The battery temperature control system according to claim 9, wherein when the communication device is not able to communicate with the external server, the control device controls the temperature control device to control the temperature of the battery according to the normal temperature control.

11. The battery temperature control method according to claim 9, wherein the first battery temperature threshold is set to be higher than the predetermined temperature range which is based on the normal temperature control, a predicted cooling amount of the battery at the first time or the first position in the travel plan in the case where it is assumed that the normal temperature control is executed is predicted, an excessive cooling amount which is an excessive cooling amount in the predicted cooling amount is calculated based on the first battery temperature threshold and the predicted temperature of the battery at the second time or the second position, and the excessive cooling amount is subtracted from the predicted cooling amount of the battery at the first time or the first position, and the operation time of the temperature control device is shortened.

12. The battery temperature control method according to claim 9, wherein the first battery temperature threshold is set to be lower than the predetermined temperature range which is based on the normal temperature control, a predicted heating amount of the battery at the first time or the first position in the travel plan in the case where it is assumed that the normal temperature control is executed is predicted, an excessive heating amount which is an excessive heating amount in the predicted heating amount is calculated based on the first battery temperature threshold and the predicted temperature of the battery at the second time or the second position, and the excessive heating amount is subtracted from the predicted heating amount of the battery at the first time or the first position, and the operation time of the temperature control device is shortened.

13. A battery temperature control system comprising:

a temperature control device configured to control a temperature of a battery mounted on a vehicle; and an information processing device configured to control the temperature control device, wherein the information processing device includes:

a travel plan acquisition unit configured to acquire a travel plan of the vehicle, a battery input and output acquisition unit configured to acquire a required input and output of the battery predicted when the vehicle travels according to the travel plan, a target temperature acquisition unit configured to acquire a first battery temperature threshold which is a target temperature of the battery at which the required input and output is satisfied, a temperature control planning unit configured to create a temperature control plan of the battery when the vehicle travels according to the travel plan, and a temperature control unit configured to control the temperature of the battery by operating the temperature control device, and the temperature control planning unit is configured to:

predict a temperature transition of the battery when the vehicle travels according to the travel plan in a case where it is assumed that normal temperature control for controlling the temperature of the battery is executed such that the temperature of the battery is in a predetermined temperature range, acquire a predicted temperature control amount of the battery at a first time or a first position in the travel plan in the case where it is assumed that the normal temperature control is executed, calculate an excessive temperature control amount, which is an excessive amount in the predicted temperature control amount, based on the first battery temperature threshold and a predicted temperature of the battery at a second time later than the first time or a second position ahead of the first position, and subtract the excessive temperature control amount from the predicted temperature control amount at the first time or the first position and shorten an operation time of the temperature control device, wherein the first battery temperature threshold includes a high-temperature-side threshold and a low-temperature-side threshold which is a temperature lower than the high-temperature-side threshold, the battery is chargeable by electric power from an external power supply, and when the travel plan includes charging of the battery with the external power supply, the temperature transition of the battery is predicted such that the temperature of the battery at a start of the charging is the low-temperature-side threshold.

\* \* \* \* \*